(12) United States Patent
Fujimoto

(10) Patent No.: US 10,110,157 B2
(45) Date of Patent: Oct. 23, 2018

(54) MACHINE TOOL

(71) Applicant: FANUC CORPORATION, Yamanashi (JP)

(72) Inventor: Taisei Fujimoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/460,576

(22) Filed: Mar. 16, 2017

(65) Prior Publication Data
US 2017/0272027 A1    Sep. 21, 2017

(30) Foreign Application Priority Data
Mar. 18, 2016  (JP) .................................. 2016-054611

(51) Int. Cl.
H02P 7/18       (2006.01)
H02P 29/024    (2016.01)
(Continued)

(52) U.S. Cl.
CPC .......... *H02P 29/025* (2013.01); *B23Q 1/0009* (2013.01); *H02P 25/06* (2013.01); *Y02P 70/167* (2015.11)

(58) Field of Classification Search
CPC ... H02P 7/18; H02P 8/36; H02P 29/02; H02H 7/08; H02H 3/00; H02J 9/00
See application file for complete search history.

(56) References Cited

U.S. PATENT DOCUMENTS 5,609,448 A *  3/1997  Oohara ..................... B41C 1/04
                                                       101/463.1
6,626,735 B2 * 9/2003  Ammi ..................... B24B 55/00
                                                         451/242
(Continued)

FOREIGN PATENT DOCUMENTS

JP        4237301 A      8/1992
JP         895602 A      4/1996
(Continued)

OTHER PUBLICATIONS

English Abstract and Machine Translation for Japanese Publication No. 2007-185748 A, published Jul. 26, 2007, 6 pgs.
(Continued)

*Primary Examiner* — Bickey Dhakal
(74) *Attorney, Agent, or Firm* — Fredrikson & Byron, P.A.

(57) ABSTRACT

A machine tool includes a drive unit driving a tool for machining a workpiece, and a control unit controlling the drive unit. The machine tool further includes an abnormality determining unit that determines whether machining can be continued, based on operation information of the drive unit, and a power failure detection unit that switches the power source of the control unit from a normal power supply unit to an emergency power supply unit if power failure is detected, and switches the power source from the emergency power supply unit to the normal power supply unit if recovery of power supply is detected after power failure. The control unit stops operation of the drive unit when power failure is detected, and thereafter, if recovery of power supply is detected, and the abnormality determining unit determines that machining can be continued, the control unit drives the drive unit, thereby automatically resuming machining.

11 Claims, 4 Drawing Sheets

(51) Int. Cl.
*B23Q 1/00* (2006.01)
*H02P 25/06* (2016.01)

(56) References Cited

U.S. PATENT DOCUMENTS

| | | | | |
|---|---|---|---|---|
| 8,531,149 B2* | 9/2013 | Kataoka | ............... | G05B 19/406 |
| | | | | 318/569 |
| 9,124,204 B2* | 9/2015 | Takezawa | ............. | H02M 7/217 |
| 9,401,669 B2* | 7/2016 | Tsutsumi | ............. | H02P 29/025 |
| 2007/0054598 A1* | 3/2007 | Uchida | .................... | B23Q 5/28 |
| | | | | 451/5 |
| 2012/0098475 A1* | 4/2012 | Noguchi | ............... | H02P 29/025 |
| | | | | 318/479 |

FOREIGN PATENT DOCUMENTS

| | | |
|---|---|---|
| JP | 2004220384 A | 8/2004 |
| JP | 2007185748 A | 7/2007 |
| JP | 2008204365 A | 9/2008 |
| JP | 2008234278 A | 10/2008 |
| JP | 201173069 A | 4/2011 |

OTHER PUBLICATIONS

English Abstract and Machine Translation for Japanese Publication No. 04-237301 A, published Aug. 25, 1992, 6 pgs.
English Abstract and Machine Translation for Japanese Publication No. 2008-234278 A, published Oct. 2, 2008, 10 pgs.
English Abstract and Machine Translation for Japanese Publication No. 2004-220384 A, published Aug. 5, 2004, 12 pgs.
English Abstract and Machine Translation for Japanese Publication No. 08-095602 A, published Apr. 12, 1996, 11 pgs.
English Abstract and Machine Translation for Japanese Publication No. 2008-204365 A, published Sep. 4, 2008, 18 pgs.
English Abstract and Machine Translation for Japanese Publication No. 2011-073069 A, published Apr. 14, 2011, 16 pgs.

* cited by examiner

MACHINE TOOL

CROSS-REFERENCE TO RELATED APPLICATION

This application is based upon and claims the benefit of priority from Japanese Patent Application No. 2016-054611 filed on Mar. 18, 2016, the contents of which are incorporated herein by reference.

BACKGROUND OF THE INVENTION

Field of the Invention

The present invention relates to a machine tool for carrying out machining on a workpiece using a tool.

Description of the Related Art

Japanese Laid-Open Patent Publication No. 2007-185748 discloses a method of restarting a machine tool. To provide a brief description thereof, in such a restarting method for a machine tool, the progress of machining a workpiece is managed by way of a simple command which is added to a machining program. In addition, at a time of restarting the machine tool after a power failure in the midst of machining, on the basis of management information, a control is automatically jumped to a certain position in the machining program to be jumped to when restarting of the machining program is carried out.

Japanese Laid-Open Patent Publication No. 04-237301 discloses a control device for an automatic processing facility at the time of a power failure or service interruption. To provide a brief description thereof, when a power failure is detected, the control device of the automatic processing facility switches to a backup power supply, and stops operation of the machine tool and a transfer device in a preparatory or standby state for automatic operation thereof, so that machining can be resumed when the power failure is resolved.

SUMMARY OF THE INVENTION

However, with the above-described Japanese Laid-Open Patent Publication No. 2007-185748, each time that a power failure occurs, the operator must restart the machine tool, and time and labor are consumed in order to restore the machine tool to a working condition. In particular, such a procedure is even more troublesome in the case that the power failure is in the form of a momentary power failure. Further, with the above-described Japanese Laid-Open Patent Publication No. 04-237301, in order to facilitate starting again after power recovery, operations of the machine tool and the transfer device are stopped and placed in a standby state for automatic operation thereof, and then resumed after power recovery. However, in this case, no consideration is given to problems or malfunctions caused by the power failure. For example, in the case that the tool becomes broken or malfunctions due to the occurrence of the power failure, or if there is a possibility that the tool may become broken or malfunction when machining is started again, proper processing cannot be performed even if machining is resumed.

Thus, the present invention has the object of providing a machine tool which is capable of resuming machining appropriately without being restarted, in the event that power is recovered after the occurrence of a power failure.

An aspect of the present invention is characterized by a machine tool equipped with a drive unit configured to drive a tool configured to machine a workpiece, and a control unit configured to control the drive unit, the machine tool including a power failure detection unit configured to detect a power failure by monitoring an input power source configured to supply electrical power to the control unit, an auxiliary power source configured to supply electrical power to the control unit at the time of a power failure, a recording unit in which operation information of the drive unit is recorded, and an abnormality determining unit configured to determine whether or not it is possible for machining by the machine tool to be continued, based on the operation information that is recorded in the recording unit. In the event that a power failure is detected, the power failure detection unit switches the power source of the control unit from the input power source to the auxiliary power source, whereas in the event that it is detected that supply of electrical power from the input power source has been recovered after the power failure, the power failure detection unit switches the power source of the control unit from the auxiliary power source to the input power source. Further, the control unit stops operation of the drive unit when the power failure is detected by the power failure detection unit, and thereafter, in the event that the power failure detection unit detects that supply of electrical power from the input power source has been recovered, and the abnormality determining unit determines that it is possible for machining by the machine tool to be continued, the control unit drives the drive unit to thereby automatically resume machining.

In accordance with such a configuration, in the event that supply of power by the input power source is recovered after the occurrence of a power failure, and it is determined that it is possible for machining by the machine tool to be continued on the basis of the operation information indicative of operation of the drive unit, it is possible for machining to be resumed without resetting and restarting the machine tool. Further, since it is not necessary to restart the machine tool, man hours is reduced, and operation of the machine tool can rapidly be recovered after supply of power has been recovered. Further, since machining is not resumed if it is impossible for machining by the machine tool to be continued, machining of the workpiece is not performed needlessly.

The machine tool according to the aspect of the present invention may further include a normal power supply unit configured to supply electrical power to the control unit using the input power source, and an emergency power supply unit configured to supply electrical power to the control unit using the auxiliary power source at the time of a power failure.

The machine tool according to the aspect of the present invention may further include a power supply unit having a backup function configured to supply electrical power to the control unit using the input power source, and supply electrical power to the control unit using the auxiliary power source at the time of a power failure.

In the machine tool according to the aspect of the present invention, the control unit may prohibit automatic resumption of machining in the event that recovery of supply of electrical power from the input power source is not detected before elapse of a fixed time from the power failure being detected by the power failure detection unit. In accordance with this feature, since machining can be resumed automatically only if the power failure is a momentary power failure, it is not necessary to restart the machine tool each time that a momentary power failure occurs, and together with reducing man hours, it is possible to recover operation of the machine tool quickly.

In the machine tool according to the aspect of the present invention, the power failure detection unit need not carry out switching from the auxiliary power source to the input power source, in the event that recovery of supply of electrical power from the input power source is detected after elapse of the fixed time from the power failure being detected. In accordance with this feature, it is possible to prevent the power supply of the control unit from being switched automatically when a power failure occurs other than a momentary power failure.

In the machine tool according to the aspect of the present invention, in the case that a power failure is detected, the power failure detection unit may output a power failure detection signal to the control unit, and in the case that recovery of supply of electrical power from the input power source is detected, the power failure detection unit may output a recovery detection signal to the control unit. In accordance with this feature, the control unit can recognize the power failure of the input power source as well as recovery thereof.

In the machine tool according to the aspect of the present invention, in the case that it is determined that a load greater than or equal to a predetermined value or an unexpected load is being applied to the drive unit due to stoppage of operation of the drive unit as a result of a power failure, on the basis of the operation information recorded in the recording unit, the abnormality determining unit may determine that it is impossible to continue machining by the machine tool. In accordance with this feature, it can be determined, with high accuracy, whether or not it is possible to continue machining by the machine tool, it is possible to prevent the drive unit or the tool from becoming damaged, and thus needless machining of the workpiece is avoided.

The machine tool according to the aspect of the present invention may further include a tool recognition unit configured to recognize a state of the tool, and transmit the recognized state of the tool to the abnormality determining unit. In this case, the abnormality determining unit may determine whether or not it is possible for machining by the machine tool to be continued, using, in addition to the operation information that is recorded in the recording unit, the state of the tool recognized by the tool recognition unit. In accordance with this feature, since the actual state of the tool recognized by the tool recognition unit is taken into consideration, it is possible to determine accurately and with high precision whether or not machining by the machine tool can be continued.

In the machine tool according to the aspect of the present invention, the tool recognition unit may recognize as a state of the tool at least one from among blade chipping of the tool, breakage of the tool, and bending of the tool. In accordance with this feature, it is possible to prevent the tool from becoming damaged, and needless machining of the workpiece is avoided.

In the machine tool according to the aspect of the present invention, the abnormality determining unit may determine whether or not it is possible for machining by the machine tool to be continued, using, in addition to the operation information that is recorded in the recording unit, machining content by the tool at a time that the control unit has stopped operation of the drive unit. In accordance with this feature, needless machining of the workpiece is avoided.

In the machine tool according to the aspect of the present invention, the control unit may machine the workpiece by controlling the drive unit according to a machining program, and the abnormality determining unit may acquire, from the machining program, the machining content by the tool at the time that the control unit has stopped operation of the drive unit. Consequently, the abnormality judging unit can accurately acquire the machining content when operation of the drive unit has been stopped.

According to the present invention, in the event that supply of power by the input power source is recovered after the occurrence of a power failure, and it is determined that it is possible for machining by the machine tool to be continued, on the basis of the operation information indicative of operation of the drive unit, it is possible for machining to be resumed without resetting and restarting the machine tool. Further, since it is not necessary to restart the machine tool, man hours can be reduced, and operation of the machine tool can rapidly be recovered after supply of power has been recovered. Further, since machining is not resumed if it is impossible for machining by the machine tool to be continued, machining of the workpiece is not performed needlessly.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a machine tool according to the present invention will be presented and described in detail below with reference to the accompanying drawings.

[First Embodiment]

Figure 1:
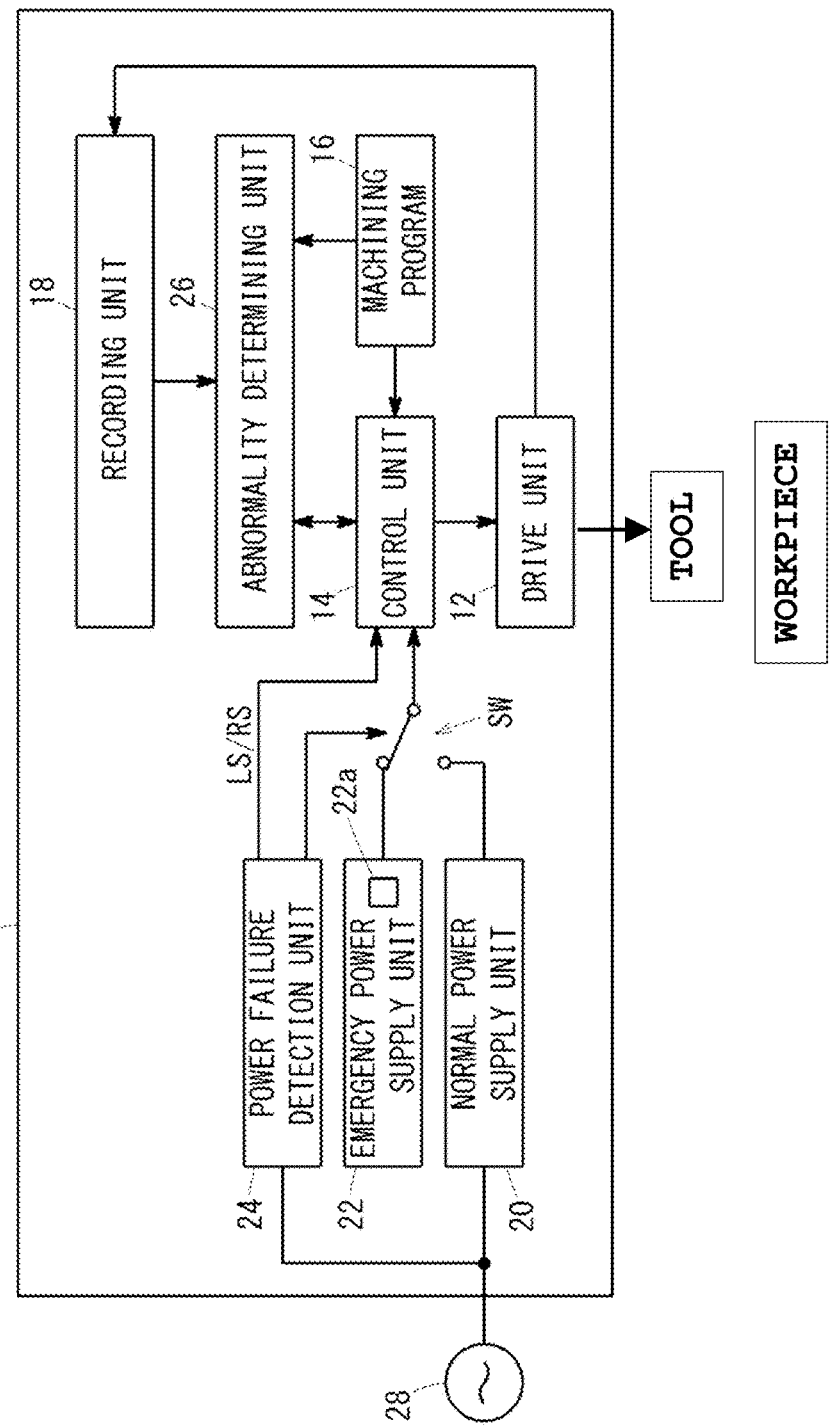
FIG. 1 is a schematic block diagram showing an electrical configuration of a machine tool according to a first embodiment.

FIG. 1 is a schematic block diagram showing the electrical configuration of a machine tool 10 according to a first embodiment. The machine tool 10 is equipped with a drive unit 12, a control unit 14, a machining program 16, a recording unit 18, a normal power supply unit 20, an emergency power supply unit 22, a switching circuit SW, a power failure detection unit 24, and an abnormality determining unit 26.

The drive unit 12 drives a tool for machining a workpiece (not shown), and is constituted by a servomotor or a linear motor or the like. The control unit 14 controls the drive unit 12 according to the machining program 16 in order to machine the workpiece.

The control unit 14 is constituted by a computer such as a CPU or the like, and the machining program 16 is recorded in a non-illustrated recording medium. The control unit 14 may control the drive unit 12 by supplying to the drive unit 12 electrical power that is supplied from the normal power supply unit 20 or the emergency power supply unit 22. In this case, the control unit 14 may also control the amount of electrical power that is supplied to the drive unit 12.

The drive unit 12 records in the recording unit 18 operation information that indicates operations of the drive unit 12. For example, the drive unit 12 may include a detection sensor for detecting a movement amount, a position and speed, etc., of the tool, and information detected by the detection sensor may be recorded as operation information in the recording unit 18. Further, because the control unit 14 controls the drive unit 12 using the detection sensor provided in the drive unit 12, the control unit 14 controls the drive unit 12 in such a manner that the operation information of the drive unit 12 (movement amount, position, speed, etc., of the tool) may be recorded in the recording unit 18.

The normal power supply unit 20 supplies electrical power to the control unit 14 using an input power source 28 (for example, an external power source such as a commercial power source that serves as a power source for the machine tool 10). The normal power supply unit 20 includes, for example, an AC/DC converter and/or a DC/DC converter, neither of which is shown, and converts the voltage of the input power source 28 into a predetermined voltage. The predetermined voltage may be a voltage that is suitable for the control unit 14. The emergency power supply unit 22 serves to supply electrical power to the control unit 14 at the time of a power failure, during which power from the input power source 28 is not supplied to the machine tool 10. The emergency power supply unit 22 includes an auxiliary power source 22a, and an AC/DC converter and/or a DC/DC converter or the like, neither of which is shown. The auxiliary power source 22a is constituted by a storage battery such as a secondary battery and/or a generator, etc. The AC/DC converter and/or the DC/DC converter of the emergency power supply unit 22 convert the voltage of the auxiliary power source 22a into a predetermined voltage. The predetermined voltage may be a voltage that is suitable for the control unit 14. If the auxiliary power source 22a is constituted in the form of a secondary battery, the emergency power supply unit 22 may charge the auxiliary power source 22a, which is a secondary battery, using the input power source 28.

The switching circuit SW is a circuit for connecting either one of the normal power supply unit 20 and the emergency power supply unit 22 alternatively to the control unit 14. Consequently, only the power of one from among the power of the normal power supply unit 20 and the emergency power supply unit 22 is supplied to the control unit 14. At a normal time apart from a power failure, the control unit 14 and the normal power supply unit 20 are connected by the switching circuit SW.

The power failure detection unit 24 detects a power failure by monitoring the electrical power supplied from the input power source 28. The power failure detection unit 24 includes a current sensor and/or a voltage sensor, neither of which is shown, and a computer. A power failure is detected based on a current value and/or a voltage value, which are detected by the current sensor and/or the voltage sensor. In the case that a power failure is detected, the power failure detection unit 24 controls the switching circuit SW in order to switch the power source of the control unit 14 from the normal power supply unit 20 to the emergency power supply unit 22. Stated otherwise, at the time of a power failure, the power source of the control unit 14 is switched from the input power source 28 to the auxiliary power source 22a. Consequently, the emergency power supply unit 22 and the control unit 14 are connected by the switching circuit SW, whereupon electrical power from the emergency power supply unit 22 is supplied to the control unit 14. When a power failure is detected, the power failure detection unit 24 outputs a power failure detection signal LS to the control unit 14. When the power failure detection signal LS is transmitted thereto from the power failure detection unit 24, the control unit 14 stops operation of the drive unit 12. Accordingly, machining is halted.

Also, after detecting the power failure, the power failure detection unit 24 continues to monitor the electrical power that is supplied from the input power source 28. In addition, before elapse of a fixed time T from detection of the power failure, if it is detected that supply of electrical power from the input power source 28 has been resumed (stated otherwise, if it is detected that supply of power by the input power source 28 has been recovered), the power failure detection unit 24 controls the switching circuit SW, to thereby return (switch) the power source of the control unit 14 from the emergency power supply unit 22 to the normal power supply unit 20. In other words, in the case that supply of power from the input power source 28 is recovered before elapse of the fixed time (predetermined time) T from the time of the power failure, the power source of the control unit 14 is returned to the input power source 28. Consequently, the normal power supply unit 20 and the control unit 14 are connected by the switching circuit SW, whereupon power from the normal power supply unit 20 is supplied to the control unit 14. The power failure detection unit 24 outputs a recovery detection signal RS to the control unit 14 when recovery of supply of power by the input power source 28 is detected before elapse of the fixed time T from detection of the power failure. The fixed time T is a time for determining whether the power failure is a momentary service interruption (momentary power failure) or not. Consequently, in the case that supply of power from the input power source 28 is recovered before elapse of the fixed time T from the power failure, the power failure detection unit 24 determines that the power failure is a momentary power failure.

Moreover, in the case that the power failure detection unit 24 detects recovery of supply of power by the input power source 28 after elapse of the fixed time T from detection of the power failure, the power source of the control unit 14 need not be returned to the normal power supply unit 20. In other words, the switching circuit SW is not controlled. In this case, the power failure detection unit 24 does not have to output the recovery detection signal RS to the control unit 14.

The abnormality determining unit 26 determines whether or not it is possible for machining by the machine tool 10 to be continued, on the basis of the operation information of the drive unit 12 that is recorded in the recording unit 18. Further, on the basis of the operation information of the drive unit 12 that is recorded in the recording unit 18, the abnormality determining unit 26 determines whether an abnormal load is being applied to the drive unit 12 (or the tool), for example, due to stoppage of operation of the drive unit 12 as a result of a power failure. In addition, when it is determined that an abnormal load is being applied, the abnormality determining unit 26 determines that it is impossible to continue machining by the machine tool 10. As such an abnormal load, there may be cited, for example, the case of an unexpected load, or a load that is greater than or equal to a predetermined value.

The abnormality determining unit 26 determines whether or not it is possible for machining by the machine tool 10 to be continued, on the basis of the operation information that is recorded in the recording unit 18, and at a timing at which the power failure detection signal LS or the recovery detection signal RS is transmitted (i.e., a timing at which a power failure or recovery of power is detected). Therefore, the control unit 14 or the power failure detection unit 24 transmits the power failure detection signals LS or the recovery detection signal RS to the abnormality determining unit 26.

The control unit 14 automatically resumes machining by driving the drive unit 12, when the recovery detection signal RS is transmitted prior to elapse of the fixed time T from transmission of the power failure detection signal LS from the power failure detection unit 24, and when the abnormality determining unit 26 determines that machining by the machine tool 10 can be continued. Stated otherwise, the control unit 14 automatically resumes machining by driving the drive unit 12 again, when supply of power from the input power source 28 is recovered prior to elapse of the fixed time T from occurrence of the power failure, and when the abnormality determining unit 26 determines that machining by the machine tool 10 can be continued.

In the case that the recovery detection signal RS is not transmitted even though the fixed time T has elapsed from transmission of the power failure detection signal LS from the power failure detection unit 24, the control unit 14 may prohibit automatic resumption of machining.

Next, a description will be given concerning operations of the machine tool 10 according to the first embodiment with reference to the flowchart of FIG. 2. Until machining is stopped in step S3 of FIG. 2, it is assumed that the control unit 14 carries out machining with respect to the workpiece by controlling the drive unit 12 in accordance with the machining program 16, and that operation information indicative of information concerning the operations of the drive unit 12 continues to be recorded in the recording unit 18.

First, in step S1, it is determined whether or not the power failure detection unit 24 has detected a power failure. If it is determined in step S1 that a power failure is not detected, the routine returns to step S1, and if it is determined that a power failure was detected, the routine proceeds to step S2. In step S2, the power failure detection unit 24 controls the switching circuit SW, and switches the power source of the control unit 14 to the emergency power supply unit 22. At this time, the power failure detection unit 24 outputs a power failure detection signal LS to the control unit 14.

Next, in step S3, when the power failure detection signal LS is transmitted from the power failure detection unit 24, the control unit 14 stops machining of the workpiece. Consequently, recording of operation information in the recording unit 18 also is stopped. Next, in step S4, the power failure detection unit 24 (or the control unit 14) resets and thereafter starts a timer. In addition, in step S5, the power failure detection unit 24 (or the control unit 14) determines whether or not the time measured by the timer has exceeded the fixed time T. In other words, it is determined whether or not the fixed time T has elapsed from detection of the power failure. If it is determined in step S5 that the fixed time T has not elapsed, the routine proceeds to step S6, whereupon the power failure detection unit 24 (or the control unit 14) determines whether or not recovery of supply of power by the input power source 28 has been detected. In the case of the control unit 14, recovery of supply of power is detected by whether the recovery detection signal RS has been transmitted thereto or not.

In step S6, if it is determined that recovery of supply of power from the input power source 28 is not detected, the routine returns to step S5. On the other hand, if it is determined in step S6 that recovery of supply of power from the input power source 28 was detected (in other words, if it is determined that the power failure is a momentary power failure), then in step S7, the power failure detection unit 24 controls the switching circuit SW, and returns the power source of the control unit 14 to the normal power supply unit 20. At this time, the power failure detection unit 24 outputs the recovery detection signal RS to the control unit 14. Next, in step S8, the abnormality determining unit 26 determines whether or not it is possible for machining by the machine tool 10 to be continued, on the basis of the operation information of the drive unit 12 that is recorded in the recording unit 18. For example, the abnormality determining unit 26 determines whether or not an abnormal load is being applied to the drive unit 12 (or the tool).

In addition, in step S9, the control unit 14 resumes driving of the drive unit 12, and automatically resumes machining, when the recovery detection signal RS is transmitted prior to elapse of the fixed time T from transmission of the power failure detection signal LS, and when the abnormality determining unit 26 determines that machining by the machine tool 10 can be continued.

On the other hand, if it is determined in step S5 that the fixed time T has elapsed from the power failure detection unit 24 having detected the power failure, but without having detected recovery of supply of power by the input power source 28, or if it is determined in step S8 that it is impossible for machining by the machine tool 10 to continue, the routine proceeds to step S10. In step S10, after the operator has confirmed the state of the machine tool 10 and resolved any problems therein, the operator resets and restarts the machine tool 10 (step S10). At this time, if it was determined in step S5 that the fixed time T has elapsed from the detection of the power failure, but without having detected recovery of supply of power by the input power source 28, or if it was determined in step S8 that it is impossible for machining by the machine tool 10 to continue, the power failure detection unit 24 or the control unit 14 may notify this fact to the operator. Accordingly, it is possible for the operator to promptly carry out the operations of step S10. As a method of providing such notification to the operator, for example, it is possible to notify the operator by displaying such facts on a non-illustrated display device. Further, an alarm sound (including notification by voice) may be output from a sound output device such as a non-illustrated speaker or the like.

Then, the routine proceeds to step S11, whereupon the control unit 14 resumes driving of the drive unit 12, and thereby resumes machining.

In this instance, in the case that the routine branches to NO at step S8 and proceeds to step S10, since the power source of the control unit 14 already is returned to the normal power supply unit 20, after the operation of step S10, then in step S11, no problems occur even if machining is resumed in that state. However, if the routine branches to YES at step S5 and proceeds to step S10, the power source of the control unit 14 is still the emergency power supply unit 22. In this state, after the operation of step S10 is completed and machining is resumed in step S11, supply of power from the input power source 28 is recovered. Therefore, after machining is resumed in step S11, when the power failure detection unit 24 detects such recovery of supply of power, and the power source of the control unit 14 is returned to the normal power supply unit 20, there is a possibility for a malfunction to occur. Accordingly, in this case, even if the power failure detection unit 24 detects recover of supply of power by the input power source 28 after elapse of the fixed time T from detection of the power failure, the power source of the control unit 14 is not returned to the normal power supply unit 20. In other words, the switching circuit SW is not controlled. In this case, the switching circuit SW may be switched at an appropriate timing by an operation of the operator. Further, even if recovery is detected, the power failure detection unit 24 does not have to output the recovery detection signal RS to the control unit 14.

Further, if the routine branches to YES at step S5 and proceeds to step S10, since the power source of the control unit 14 is still switched to the emergency power supply unit 22, after the operator has confirmed the state of the machine tool 10 and resolved any problems therein, then upon supply of power from the input power source 28 being recovered, the machine tool 10 may be restarted and machining may be resumed. In this case, at the time that recovery of supply of power is detected, even if the power source of the control unit 14 is returned to the normal power supply unit 20, the possibility for a malfunction to occur is low. Consequently, in this case, even if the power failure detection unit 24 detects recovery of supply of power by the input power source 28 after elapse of the fixed time T from detection of the power failure, the switching circuit SW is controlled, and the power source of the control unit 14 may be returned from the emergency power supply unit 22 to the normal power supply unit 20. At this time, although it is not necessary for the recovery detection signal RS to be output, the power failure detection unit 24 may output the recovery detection signal RS to the control unit 14.

[Second Embodiment]

Figure 3:
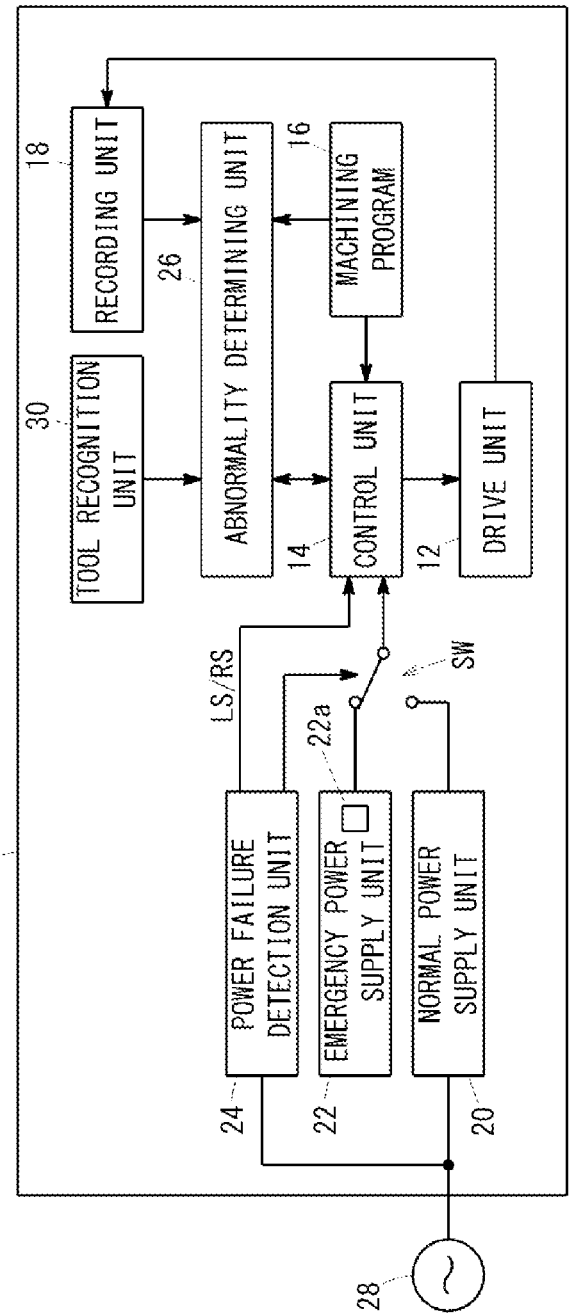
FIG. 3 is a schematic block diagram showing an electrical configuration of a machine tool according to a second embodiment.

Next, a description will be made in relation to a second embodiment. FIG. 3 is a schematic block diagram showing the electrical configuration of a machine tool 10 according to the second embodiment. Structural components thereof, which are the same as those of the first embodiment, are denoted with the same reference characters, and only different structural components thereof will be described.

The machine tool 10 according to the second embodiment, in addition to the drive unit 12, the control unit 14, the machining program 16, the recording unit 18, the normal power supply unit 20, the emergency power supply unit 22, the power failure detection unit 24, and the abnormality determining unit 26, is further equipped with a tool recognition unit 30.

The tool recognition unit 30 serves to confirm the state of the tool. The tool recognition unit 30 recognizes as a state of the tool, for example, at least one from among blade chipping of the tool, breakage of the tool, and bending of the tool. The tool recognition unit 30 includes, for example, an image capturing element, such as a CCD, a CMOS, or the like, and an image recognition unit, and recognizes the state of the tool on the basis of image data captured by the image capturing element. Since the technique for recognizing the imaged subject is well known, explanation thereof is omitted.

The abnormality determining unit 26 further takes into consideration the state of the tool as recognized by the tool recognition unit 30, and determines whether or not it is possible for machining by the machine tool 10 to be continued. Even in the case that the abnormality determining unit 26 judges that there is no abnormal load being applied to the drive unit 12 (or the tool), if it is determined that at least one from among blade chipping of the tool, breakage of the tool, and bending of the tool has occurred, the abnormality determining unit determines that it is impossible for machining by the machine tool 10 to continue. Stated otherwise, only in the case that the abnormality determining unit 26 judges that there is no abnormal load being applied to the drive unit 12 (or the tool), and determines that there is no occurrence of blade chipping of the tool, breakage of the tool, and bending of the tool, the abnormality determining unit 26 determines that it is possible for machining by the machine tool 10 to continue. In general, breakage of the tool or bending of the tool occurs in the event that an abnormal load is being applied to the drive unit 12 (or the tool). However, even in the case that, based on the operation information recorded in the recording unit 18, it is determined that an abnormal load is not being applied to the drive unit 12 (or the tool), since the actual state of the tool is recognized by the tool recognition unit 30, the abnormality determining unit 26 is capable of determining accurately and with high precision whether or not it is possible for machining by the machine tool 10 to continue.

Moreover, the abnormality determining unit 26 may determine whether or not it is possible for machining by the machine tool 10 to be continued on the basis only of the state of the tool as recognized by the tool recognition unit 30. In this case, since there is no need for the abnormality determining unit 26 to determine whether or not an abnormal load is being applied to the drive unit 12 (or the tool) based on the operation information recorded in the recording unit 18, the recording unit 18 becomes unnecessary.

Figure 2:
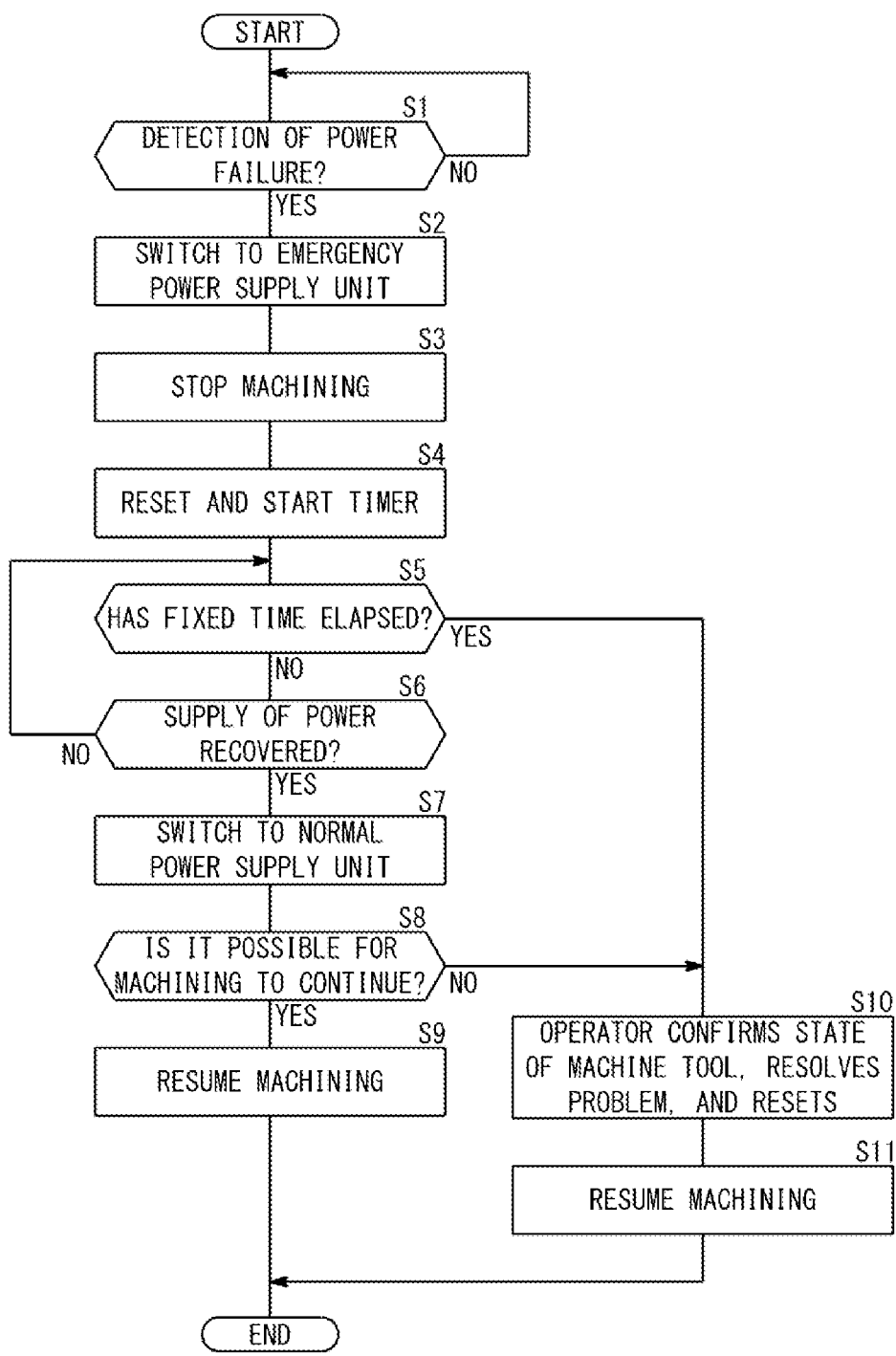
FIG. 2 is a flowchart showing operations of the machine tool according to the first embodiment.

In this manner, according to the second embodiment, the determination by the abnormality determining unit 26 of whether or not machining can be continued (corresponding to step S8 in FIG. 2) differs slightly from that of the first embodiment, but other operations apart therefrom are the same as those shown in FIG. 2. Therefore, in relation to the second embodiment, descriptions of operations of the machine tool 10 using the flowchart are omitted.

Modifications of the First and Second Embodiments

Each of the above-described first and second embodiments may be modified in the following ways.

(Modification 1) According to a first modification, when the control unit 14 stops operation of the drive unit 12 accompanying detection of a power failure, the abnormality determining unit 26 further determines whether or not machining by the machine tool 10 can be continued based on machining content by the tool. In this case, the abnormality determining unit 26 acquires, from the machining program 16, the machining content by the tool at the time that the control unit 14 stops operation of the drive unit 12. For example, the control unit 14 may output to the abnormality determining unit 26 address information of a program or subroutine from within the machining program 16, which is executed immediately before operation of the drive unit 12 is stopped, and the abnormality determining unit 26 may acquire the program or the subroutine from the machining program, based on the address information. Further, the control unit 14 may output the program or the subroutine that was executed immediately before operation of the drive unit 12 was stopped, to the abnormality determining unit 26.

In the case that the machining content of the acquired program indicates that it is highly likely for a defective product to be formed if machining is continued, the abnormality determining unit 26 determines that it is impossible to continue with machining. Conversely, in the case that the machining content of the acquired program indicates that it is unlikely for a defective product to be formed even though machining is continued, the abnormality determining unit 26 determines that machining can be continued. For example, in the case that the machining program executed immediately before stopping operation of the drive unit 12 is a tapping program, since the possibility is high for a defective product to be formed if machining is continued, the abnormality determining unit 26 determines that it is impossible for machining to continue. Further, in the case that the machining program executed immediately before stopping operation of the drive unit 12 is a simple drilling program, since the possibility is low for a defective product to be formed even if machining is continued, the abnormality determining unit 26 determines that it is possible to continue with machining.

In the case that the first modification and the above-described first embodiment are combined, if it is determined that an abnormal load is not being applied to the drive unit 12 (or the tool), and further, the machining content of the program executed immediately before stoppage of operation of the drive unit 12 is such that the possibility for a defective product to be formed is low even if machining is continued, then it may be determined that it is possible for machining by the machine tool 10 to continue. Further, if the machining content of the program executed immediately before stoppage of operation of the drive unit 12 is such that the possibility for a defective product to be formed is low even if machining is continued, then it may be determined that it is possible for machining by the machine tool 10 to continue. In this case, there is no need to determine whether or not an abnormal load is being applied to the drive unit 12 (or the tool).

In the case that the first modification and the above-described second embodiment are combined, if it is determined that an abnormal load is not being applied to the drive unit 12 (or the tool), and it is determined that there is no occurrence of blade chipping of the tool, breakage of the tool, or bending of the tool, and further, the machining content of the program executed immediately before stoppage of operation of the drive unit 12 is such that the possibility for a defective product to be formed is low even if machining is continued, then the abnormality determining unit 26 may determine that it is possible for machining by the machine tool 10 to continue. Further, in the case it is determined that there is no occurrence of blade chipping of the tool, breakage of the tool, or bending of the tool, and further, the machining content of the program executed immediately before stoppage of operation of the drive unit 12 is such that the possibility for a defective product to be formed is low even if machining is continued, the abnormality determining unit 26 may determine that it is possible for machining by the machine tool 10 to continue. In this case, there is no need to determine whether or not an abnormal load is being applied to the drive unit 12 (or the tool).

In this manner, according to the first modification, the determination by the abnormality determining unit 26 of whether or not machining can be continued (corresponding to step S8 in FIG. 2) differs slightly from that of the first embodiment, but otherwise, the features thereof are the same as those shown in FIG. 2. Therefore, in relation to the first modification, descriptions of operations of the machine tool 10 using the flowchart are omitted.

Figure 4:
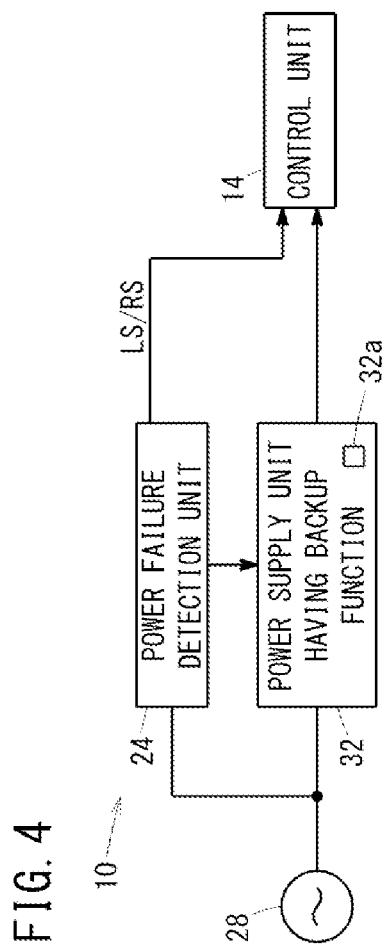
FIG. 4 is a schematic block diagram of essential parts of a machine tool according to a second modification of the first and second embodiments.

(Modification 2) The above-described first and second embodiments (including the first modification) are equipped with the normal power supply unit 20 and the emergency power supply unit 22. However, according to a second modification, as shown in FIG. 4, instead of the normal power supply unit 20, the emergency power supply unit 22, and the switching circuit SW, a single power supply unit 32 having a backup function may be provided. In FIG. 4, among the features of the machine tool 10 shown in FIG. 1 or FIG. 3, only features thereof needed to describe the modification are extracted and shown, and concerning features thereof not shown in FIG. 4, the configurations shown in FIG. 1 or FIG. 3 may be adopted.

The power supply unit 32 having a backup function supplies electrical power to the control unit 14 using the input power source 28, together with supplying electrical power to the control unit 14 using an auxiliary power source 32a at the time of a power failure. The power supply unit 32 having a backup function includes the auxiliary power source 32a, and a non-illustrated AC/DC converter and/or a non-illustrated DC/DC converter. The power supply unit 32 having a backup function, at a time of normal operation thereof (other than at the time of a power failure), converts the voltage of the input power source 28 into a predetermined voltage, and outputs the predetermined voltage to the control unit 14. At the time of a power failure, the power supply unit 32 having a backup function converts the voltage of the auxiliary power source 32a into a predetermined voltage, and outputs the predetermined voltage to the control unit 14. The predetermined voltage may be a voltage that is suitable for the control unit 14. The auxiliary power source 32a is constituted by a storage battery such as a secondary battery or a generator, etc. Further, the power supply unit 32 having a backup function includes a switching circuit (not shown) that switches between outputting of electrical power from the input power source 28 to the control unit 14, and outputting of electrical power from the auxiliary power source 32a to the control unit 14. If the auxiliary power source 32a is constituted in the form of a secondary battery, the power supply unit 32 having a backup function may charge the auxiliary power source 32a, which is a secondary battery, using the input power source 28.

When a power failure is detected, the power failure detection unit 24 outputs electrical power from the auxiliary power source 32a to the control unit 14 by controlling the power supply unit 32 having a backup function (more specifically, by controlling the switching circuit of the power supply unit 32 having a backup function). Further, when recovery of supply of power by the input power source 28 is detected, the power supply unit 32 having a backup function (more specifically, the switching circuit of the power supply unit 32 having a backup function) is controlled, whereby electrical power from the input power source 28 is output to the control unit 14. Aside from the normal power supply unit 20, the emergency power supply unit 22, and the switching circuit SW of each of the aforementioned embodiments (including the first modification) being replaced by the power supply unit 32 having a backup function, the second modification is the same as the above embodiments (including the first modification), and thus descriptions concerning the other structural features, functions, and operations thereof are omitted. In other words, the combination of the normal power supply unit 20, the emergency power supply unit 22, and the switching circuit SW of each of the aforementioned embodiments (including the first modification) serves as the power supply unit 32 having a backup function according to the second modification.

(Modification 3) In each of the above embodiments (including the first and second modifications), in the case that supply of power from the input power source 28 is recovered before elapse of a fixed time T from occurrence of a power failure, or stated otherwise, in the case of a momentary power failure, it is determined whether or not it is possible for machining to continue (step S8 of FIG. 2), and machining is resumed automatically (step S9) if continuation of machining is possible. However, apart from the case of a momentary power failure, or in other words, even in the case that supply of power by the input power source 28 is recovered after the fixed time T has elapsed from occurrence of the power failure, if it is possible for such machining to be continued (step S8: YES), machining may be resumed automatically (step S9). In this case, the operations of step S4 and step S5 are rendered unnecessary. When machining is stopped in step S3, the routine may proceed directly as is to step S6. In addition, in step S6, when it is determined that power is not recovered, the routine may remain at step S6 until it is determined that recovery of power has occurred.

In this manner, the machine tool 10 described by at least one of the aforementioned first and second embodiments and first through third modifications is equipped with the drive unit 12 that drives a tool for machining a workpiece, and the control unit 14 that controls the drive unit 12. The machine tool 10 further comprises the normal power supply unit 20 for supplying electrical power to the control unit 14 using the input power source 28, the emergency power supply unit 22 for supplying electrical power to the control unit 14 using the auxiliary power source 22a at the time of a power failure, the power failure detection unit 24 for detecting a power failure by monitoring the input power source 28, the recording unit 18 in which operation information of the drive unit 12 is recorded, and the abnormality determining unit 26 that determines whether or not it is possible for machining by the machine tool 10 to be continued on the basis of the operation information. In the event that a power failure is detected, the power failure detection unit 24 switches the power source of the control unit 14 from the normal power supply unit 20 to the emergency power supply unit 22. In addition, in the event that it is detected that supply of electrical power from the input power source 28 has been recovered after the power failure, the power failure detection unit 24 switches the power source of the control unit 14 from the emergency power supply unit 22 to the normal power supply unit 20. The control unit 14 stops operation of the drive unit 12 when the power failure is detected by the power failure detection unit 24, and thereafter, in the event that the power failure detection unit 24 detects that supply of electrical power from the input power source 28 has been recovered, and the abnormality determining unit 26 determines that it is possible for machining by the machine tool 10 to be continued, the control unit 14 drives the drive unit 12 in order to automatically resume machining.

Consequently, in the event that supply of power is recovered after the occurrence of a power failure, and it is determined that it is possible for machining by the machine tool 10 to be continued on the basis of the operation information indicative of operation of the drive unit 12, it is possible for machining to be resumed without resetting and restarting the machine tool 10. Further, since it is not necessary to restart the machine tool 10, man hours can be reduced, and operation of the machine tool 10 can rapidly be recovered after supply of power has been recovered. Further, since machining is not resumed if it is impossible for machining by the machine tool to be continued, machining of the workpiece is not performed needlessly.

Moreover, instead of the normal power supply unit 20 and the emergency power supply unit 22, the machine tool 10 may be equipped with the power supply unit 32 having a backup function. The power supply unit 32 having a backup function supplies electrical power to the control unit 14 using the input power source 28, together with supplying electrical power to the control unit 14 using the auxiliary power source 32a at the time of a power failure. In the case that a power failure is detected, the power failure detection unit 24 switches the power source of the control unit 14 from the input power source 28 to the auxiliary power source 32a. In addition, in the event that it is detected that supply of electrical power from the input power source 28 has been recovered after a power failure, the power failure detection unit 24 switches the power source of the control unit 14 from the auxiliary power source 32a to the input power source 28.

The control unit 14 may prohibit automatic resumption of machining, in the event that recovery of supply of electrical power by the input power source 28 is not detected before elapse of the fixed time T from the power failure being detected by the power failure detection unit 24. In accordance with this feature, since machining can be resumed automatically only if the power failure is a momentary power failure, it is not necessary to restart the machine tool 10 each time that a momentary power failure occurs. Thus, man hours can be reduced, and it is possible to recover operation of the machine tool 10 quickly. If the power failure is not a momentary power failure, after confirmation and inspection of the machine tool 10 by the operator, the machine tool 10 is restarted and machining is resumed.

In the case that recovery of supply of power by the input power source 28 is detected after elapse of the fixed time T from detection of the power failure, the power failure detection unit 24 does not carry out switching from the auxiliary power source 22a (or 32a) to the input power source 28. In accordance with this feature, it is possible to prevent the power supply of the control unit 14 from being switched automatically when a power failure occurs other than a momentary power failure.

In the case that a power failure is detected, the power failure detection unit 24 may output the power failure detection signal LS to the control unit 14, and in the case that recovery of supply of electrical power by the input power source 28 is detected, the power failure detection unit 24 may output the recovery detection signal RS to the control unit 14. In accordance with this feature, the control unit 14 can recognize the power failure of the input power source 28 as well as recovery thereof.

In the case it is determined that a load greater than or equal to a predetermined value or an unexpected load is being applied to the drive unit 12 due to stoppage of operation of the drive unit 12 as a result of a power failure, on the basis of the operation information recorded in the recording unit 18, the abnormality determining unit 26 may determine that it is impossible to continue machining by the machine tool 10. In accordance with this feature, it can be determined with high accuracy whether or not it is possible to continue machining by the machine tool 10. Stated otherwise, when an abnormal load (a load greater than or equal to a predetermined value, or an unexpected load) is applied to the drive unit 12, there is a high possibility that damage to the tool will occur, and machining cannot be performed appropriately.

The machine tool 10 is further equipped with the tool recognition unit 30 that recognizes the state of the tool, and transmits the recognized state of the tool to the abnormality determining unit 26. The tool recognition unit 30 recognizes as a state of the tool, for example, at least one from among blade chipping of the tool, breakage of the tool, and bending of the tool. The abnormality determining unit 26 may determine whether or not it is possible for machining by the machine tool 10 to be continued, on the basis of the state of the tool as recognized by the tool recognition unit 30, in addition to the operation information recorded in the recording unit 18. In accordance with this feature, since the actual state of the tool as recognized by the tool recognition unit 30 is taken into consideration, it is possible to determine accurately and with high precision whether or not machining by the machine tool 10 can be continued, it is possible to prevent the tool from becoming damaged, and needless machining of the workpiece is avoided.

The abnormality determining unit 26 may acquire, from the machining program 16, the machining content by the tool at a time that the control unit 14 has stopped operation of the drive unit 12, and using the acquired machining content in addition to the operation information recorded in the recording unit 18, the abnormality determining unit 26 may determine whether or not it is possible for machining by the machine tool 10 to continue. In accordance with this feature, since the machining content at the time that operation of the drive unit 12 is stopped due to the occurrence of the power failure is taken into consideration, it is possible to determine accurately and with high precision whether or not it is possible for machining by the machine tool 10 to continue, and needless machining of the workpiece is avoided.

While the invention has been particularly shown and described with reference to preferred embodiments, it will be understood that variations and modifications can be effected thereto by those skilled in the art without departing from the scope of the invention as defined by the appended claims.

What is claimed is:
1. A machine tool equipped with a drive unit configured to drive a tool configured to machine a workpiece, and a control unit configured to control the drive unit, the machine tool comprising:
a power failure detection unit configured to detect a power failure by monitoring an input power source configured to supply electrical power to the control unit;
an auxiliary power source configured to supply electrical power to the control unit at a time of the power failure;
a recording unit in which operation information indicative of operation of the drive unit is recorded; and
an abnormality determining unit configured to determine whether or not it is possible for machining by the machine tool to be continued, based on an abnormal load acting on the drive unit or the tool, the abnormality determining unit determining whether the abnormal load is acting on the drive unit or the tool based on the operation information that is recorded in the recording unit;
wherein, in an event that the power failure is detected, the power failure detection unit switches a power source of the control unit from the input power source to the auxiliary power source, whereas in an event that it is detected that supply of electrical power from the input power source has been recovered after the power failure, the power failure detection unit switches the power source of the control unit from the auxiliary power source to the input power source; and
the control unit stops operation of the drive unit immediately after the power failure is detected by the power failure detection unit, and thereafter, in an event that the power failure detection unit detects that supply of electrical power from the input power source has been recovered, and the abnormality determining unit determines that it is possible for machining by the machine tool to be continued, the control unit drives the drive unit to thereby automatically resume machining.
2. The machine tool according to claim 1, further comprising:
a normal power supply unit configured to supply electrical power to the control unit using the input power source; and
an emergency power supply unit configured to supply electrical power to the control unit using the auxiliary power source at the time of the power failure.
3. The machine tool according to claim 1, further comprising a power supply unit having a backup function configured to supply electrical power to the control unit using the input power source, and supply electrical power to the control unit using the auxiliary power source at the time of the power failure.
4. The machine tool according to claim 1, wherein the control unit prohibits automatic resumption of machining, in an event that recovery of supply of electrical power from the input power source is not detected before elapse of a fixed time from the power failure being detected by the power failure detection unit.
5. The machine tool according to claim 4, wherein the power failure detection unit does not carry out switching from the auxiliary power source to the input power source, in an event that recovery of supply of electrical power from the input power source is detected after elapse of the fixed time from the power failure being detected.
6. The machine tool according to claim 1, wherein, in a case that the power failure is detected, the power failure detection unit outputs a power failure detection signal to the control unit, and in a case that recovery of supply of electrical power from the input power source is detected, the power failure detection unit outputs a recovery detection signal to the control unit.
7. The machine tool according to claim 1, wherein, in a case that it is determined that a load greater than or equal to a predetermined value or an unexpected load is being applied to the drive unit due to stoppage of operation of the drive unit as a result of the power failure, on basis of the operation information recorded in the recording unit, the abnormality determining unit determines that it is impossible to continue machining by the machine tool.
8. The machine tool according to claim 1, further comprising:
a tool recognition unit configured to recognize a state of the tool, and transmit the recognized state of the tool to the abnormality determining unit;
wherein the abnormality determining unit determines whether or not it is possible for machining by the machine tool to be continued, using, in addition to the operation information that is recorded in the recording unit, the state of the tool recognized by the tool recognition unit.
9. The machine tool according to claim 8, wherein the tool recognition unit recognizes as the state of the tool at least one from among blade chipping of the tool, breakage of the tool, and bending of the tool.
10. The machine tool according to claim 1, wherein the abnormality determining unit determines whether or not it is possible for machining by the machine tool to be continued, using, in addition to the operation information that is recorded in the recording unit, machining content by the tool at a time that the control unit has stopped operation of the drive unit.
11. The machine tool according to claim 10, wherein:
the control unit machines the workpiece by controlling the drive unit according to a machining program; and the abnormality determining unit acquires, from the machining program, the machining content by the tool at the time that the control unit has stopped operation of the drive unit.

* * * * *